(12) United States Patent
Cavet

(10) Patent No.: US 8,326,043 B2
(45) Date of Patent: Dec. 4, 2012

(54) VIDEO DETECTION SYSTEM AND METHODS

(75) Inventor: Rene Cavet, Darmstadt (DE)

(73) Assignee: Ipharro Media GmbH, Darmstadt (DE)

(*) Notice: Subject to any disclaimer, the term of this patent is extended or adjusted under 35 U.S.C. 154(b) by 471 days.

(21) Appl. No.: 12/595,401

(22) PCT Filed: Apr. 13, 2008

(86) PCT No.: PCT/US2008/060164
§ 371 (c)(1),
(2), (4) Date: Mar. 15, 2010

(87) PCT Pub. No.: WO2008/128143
PCT Pub. Date: Oct. 23, 2008

(65) Prior Publication Data
US 2010/0329547 A1    Dec. 30, 2010

Related U.S. Application Data

(60) Provisional application No. 60/923,412, filed on Apr. 13, 2007.

(51) Int. Cl.
*G06K 9/00* (2006.01)
*G06K 9/54* (2006.01)
(52) U.S. Cl. .................. 382/190; 382/162; 382/305
(58) Field of Classification Search .......... 382/190, 382/160, 162, 199, 165, 232, 166, 224, 225, 382/226, 229, 230, 266, 305, 306; 341/50, 341/61, 110, 126, 144, 155, 120, 133, 152, 341/145; 348/571, 655, 656, 657, E9.001, 348/E9.037, 208.2, E5.065; 702/127, 145; 318/638, 652
See application file for complete search history.

(56) References Cited

U.S. PATENT DOCUMENTS 4,811,084 A * 3/1989 Belmares-Sarabia et al. ............................ 348/592
(Continued)

FOREIGN PATENT DOCUMENTS
GB        2419489        4/2006

OTHER PUBLICATIONS

International Search Report for PCT Application No. PCT/US2008/060164 dated Oct. 7, 2008.

*Primary Examiner* — Sheela Chawan
(74) *Attorney, Agent, or Firm* — Foley & Lardner LLP; Matthew L. Fenselau

(57) ABSTRACT

A video detection system and method compares a queried video segment to one or more stored video samples. Each of the queried video segments and stored video samples can be represented by respective digital image sets. A first and second comparison comprises comparing a set of low and high resolution temporal and spatial statistical moments in a COLOR9 space, and eliminating file digital image sets that do not match the queried digital image set. A third comparison generates a set of matching files by comparing a set of wavelet transform coefficients in a COLOR9 space. RGB bit-wise registration and comparison of one or more subframes of specific frames in the queried digital image set to a corresponding set of matching file subframes determines queried subframe changes. In the event of a change in a queried subframe, the changed subframe is added to the set of matching file subframes.

19 Claims, 11 Drawing Sheets

U.S. PATENT DOCUMENTS

| | | |
|---|---|---|
| 6,628,823 B1 * | 9/2003 | Holm ............................. 382/162 |
| 6,738,100 B2 | 5/2004 | Hampapur et al. |
| 7,065,250 B1 | 6/2006 | Lennon |
| 7,127,106 B1 | 10/2006 | Neil et al. |
| 7,177,470 B2 * | 2/2007 | Jasinschi et al. ............. 382/170 |
| 7,358,994 B2 * | 4/2008 | Yano ............................. 348/254 |
| 7,400,784 B2 * | 7/2008 | Joly ............................... 382/305 |
| 2004/0240562 A1 | 12/2004 | Bargeron et al. |
| 2005/0141707 A1 | 6/2005 | Haitsma et al. |
| 2006/0103732 A1 * | 5/2006 | Bateman .................... 348/208.2 |
| 2006/0187358 A1 | 8/2006 | Lienhart et al. |
| 2007/0242826 A1 * | 10/2007 | Rassool ........................ 380/201 |

\* cited by examiner

VIDEO DETECTION SYSTEM AND METHODS

CROSS-REFERENCE TO RELATED PATENT APPLICATIONS

This application is the U.S. National Stage of International Application No. PCT/US2008/060164, filed Apr. 13, 2008, published in English, which claims the benefit of U.S. Provisional Application No. 60/923,412 filed Apr. 13, 2007. The entire teachings of the above applications are incorporated herein by reference.

FIELD OF THE INVENTION

The present invention relates to a content-based retrieval system. Specifically, the present invention relates to a video feature detection, identification, and classification system to monitor video content.

BACKGROUND OF THE INVENTION

The availability of broadband communication channels to end-user devices has enabled ubiquitous media coverage with image, audio, and video content. The increasing amount of multimedia content that is transmitted globally has boosted the need for intelligent content management. Providers must organize their content and be able to detect unauthorized broadcast, usage, and alteration. Similarly, broadcasters and market researchers want to know when and where specific footage has been broadcast. Content monitoring, market trend analysis, and copyright protection are emerging applications in the new world of digital media.

Content-based retrieval (CBR) systems are commonly used to access, organize, and analyze information stored in the form of digital data representations. The digital data representations can be searched or otherwise queried to determine matches to an existing, target set of digital data representations. Matches can be determined by the degree of similarity between the queried digital data representations and the existing set of digital data representations. It is common for these digital data representations to be classified as follows: digital text, digital graphics, digital images, digital audio, digital video, digital audio and video, and combinations thereof.

Each digital data representation class, generally shares attributes, or features, particular to its class. A feature model can used to identify and define features specific to a class, and represent each digital data representation in a class by a feature set in a feature space of the given class. Consequently, a query can be confined to matching a feature set of the queried digital data representation to a feature set of the existing set of digital data representations, where both queried and existing digital data representation features are in the same feature space.

Matching features automatically, generally requires that features first be reduced to a set of numerical values. This can be accomplished using feature data sets and feature metrics that can be used for matching according to one or more rules referred to as feature measures. Feature measures are commonly determined by distances measured between corresponding feature data set elements in features of the queried and target digital data representations feature space. Such distance measures in a K-dimensional feature space are commonly referred to as K-dimensional, Nearest-Neighbor queries, or K-NN queries.

In the mid-1970s, hierarchical structures, such as tree structures, were introduced to index K-NN queries. In 1984, Guttman proposed an R-tree indexing structure, which was followed by an $R^+$-tree variant in 1987 by Sellis, and a dynamic $R^*$-tree variant in 1990 by Beckman. Features were defined in the leaf structure, partitions of the feature space, in each of the aforementioned tree structures. Distances were found to irregular convex subspaces spanning the partitions. The irregular convex subspaces made indexed K-NN queries in each of the aforementioned tree structures nearly intractable in feature spaces with dimension K greater than approximately 20 and with low distance measure variance.

Principle component analysis approaches, implemented in 1995 by Faloutsos and 1996 by Ng and Sedighain, reduced feature space dimensions using a fast approximation of the Karhunen-Loeve Transform. However, results consistently showed a loss in accuracy in K-NN queries with significant reduction in feature space dimension.

Relational databases in feature space eliminated the tree structure topology, allowing metric spaces to be defined to span the tree-structure topology with no intrinsic information of the topology itself. In 1999, Vleugels implemented a metric space and a metric space to a d-dimensioned vantage-space transform to produce a feature measure for K-NN queries, but lost queried accuracy in the transformation from relational databases to tree-structure databases.

A second set of relational database approaches were implemented by Chiueh in 1994 and by Ciaccia in 1997. The Chiueh vantage-point tree and Ciaccia M-tree both partitioned feature space recursively into smaller and smaller feature subspaces, each defined by regular hyperspheres. Centroids of hyperspheres are searched in K-NN queries, reducing complexity.

K-NN queries using the aforementioned tree structures, relational database structures, and combinations of the tree and relational database structures do not take advantage of feature set orthogonality inherent in feature sets of many digital data representations. Clusters of features can be partitioned in feature space recursively into smaller and smaller disjoint feature subspaces, nested disjoint feature subspaces, each defined by regular hyperspheres, by iteratively clustering features according to the inherent nature of the defined feature sets.

K-NN queries involving feature subspaces comprising disjoint hyperspheres allow for partial searches and increase queried accuracy for reduced search times.

SUMMARY OF THE INVENTION

The present invention fulfills needs present in the arty by providing an content-based retrieval system for digital data representations of digital footage such as films, clips, and advertisements against digital media broadcasts from virtually any source, also allowing for automatic and efficient supervision of such digital content. Systems and processes according to the present invention can be highly scalable and use superior computer vision and signal processing technology for analyzing footage in the video and in the audio domain in real time.

In some embodiments, the content-based retrieval includes one or more K-NN queries implemented over a nested, disjoint feature space of one or more digital data representations. In the present invention, digital data representations can be classified as one of the following: digital text, digital graphics, digital images, digital audio, digital video, digital audio and video, and combinations thereof.

The recursive feature space is a result of sequential feature data set extraction. Sequential feature data set extraction comprises at least: converting an encoded and compressed digital data representation into a decoded and decompressed digital data representation, mapping the decoded and decompressed digital data representation onto a digital image space, sequentially producing a set of feature data sets from the digital image space, comparing the set of feature data sets from the digital image space to a corresponding set of feature sets from a file in an existing digital data representation set, matching the digital image space to the file based on a set of feature measures and a set of thresholds, and repeating with one or more of: a new set of feature data sets and a new digital image space.

Producing a set of feature data sets comprises at least one of: producing one or more sets of spatial feature data sets from the digital image space, producing one or more sets of spatial frequency feature data sets from the digital image space, producing one or more sets of temporal feature data sets from the digital image space, producing one or more sets of temporal frequency feature data sets from the digital image space, producing one or more sets of bitmap feature data sets from the digital image space, and combinations thereof.

Further, the digital image space itself can be one or more of a spatial one-dimensional space, a spatial multidimensional space, a temporal one dimensional space, a temporal multidimensional space, a momentum space, an energy space, an RGB color space, a YCrCb color space, a YIQ color space, a YUV color space, a 9-color space, a 29-color space, a bitmap image space, and combinations thereof.

Producing the one or more sets of spatial feature data sets from the digital image space comprises producing one or more sets of spatial moments. Producing the one or more sets of spatial moments comprises producing at least one of: a mean, a variance, and a skew. Producing the one or more sets of spatial frequency feature data sets from the digital image space comprises producing one or more of: a one-dimensional DFT, a multidimensional DFT, a one-dimensional wavelet transform, and a multidimensional wavelet transform.

Producing the one or more sets of temporal feature data sets from the digital image space comprises producing a feature data set indexed by one of time and event, wherein an event comprises one of: an image, an image change, an image rate of change, an image trigger, an image message, and combinations thereof. Producing the one or more sets of temporal frequency feature data sets from the digital image space comprises producing one of: a one-dimensional z-transform, a multidimensional z-transform, an LSP, a two-dimensional LSP, a temporal wavelet transform, and combinations thereof.

Producing the one or more sets of bitmap feature data sets from the digital image space comprises producing a bitmap feature data set from one or more of: a bitmap image space, a translated bitmap image space, a rotated bitmap image space, a resized bitmap image space, and a requantized bitmap image space.

The bitmap image space comprises providing partitions in the digital image space. In one or more embodiments, providing partitions in the digital image space comprises providing a five-section partition in a spatial two-dimensional image space. In some embodiments, four of the five sections comprise trapezoids bordering each of the four edges of the spatial two-dimensional image, and a fifth section comprises a rectangle in the center of the spatial two-dimensional image. In some embodiments, four of the five sections comprise circles at or near the edges of the spatial two-dimensional image, and a fifth section comprises a circle at or near the center of the spatial two-dimensional image.

The bitmap image space comprises providing a change in resolution, wherein a full resolution of 128×128 pixels can be changed to provide for a resolution of one of: 64×64, 32×32 pixels, and additional suitable resolutions. The bitmap image space comprises providing a requantized bitmap image space by requantizing a set of amplitudes associated with one or more of: a change in the digital image space, a change in the resolution, and a change in the partition. The requantized digital image space comprises requantizing the set of amplitudes according to a constrained diffusion algorithm.

Comparing a feature data sets from a set of queried digital images to a corresponding feature data set from a set of file digital images comprises generating a set distance metrics between corresponding feature data set elements, where the set of distance metrics is generated by a set of error functions. Matching the set of queried digital images to the set of file digital images comprises grouping the set of file digital images having a corresponding set of distance metrics less than a set of thresholds.

In some embodiments, an apparatus adapted for producing video detection includes a means for extracting a plurality of feature sets common to a to a queried digital image set and for each of a first set of file digital image sets and a means for sequentially searching the plurality of feature data sets for a matching set of file digital image sets. Sequential searching comprises matching the plurality of feature data sets common to the queried digital image set and to a sequentially smaller set of subsets of the first set of file digital image sets.

The apparatus further includes a means for comparing one or more subframes of a queried digital image in the queried digital image set to one or more sets of one or more subframes of a file digital image in the matching set of file digital image sets. A set of ordered pixels in an RGB color space are compared, where the set of ordered pixels and the RGB color space are common to the queried digital image in the queried digital image set and to the file digital image in the matching set of file digital image sets.

The apparatus further includes a means for translating, resizing, and requantizing the one or more subframes of the queried digital image and repeating the aforementioned comparison to reduce one or more matching error functions of one or more subsets of the set of ordered pixels.

The apparatus further includes a means for detecting a match if the one or more matching error functions is less than a corresponding matching set of thresholds. In the event that no detection is made, the apparatus includes means for adding, to the one or more sets of one or more subframes of the file digital image in the matching set of file digital image sets, one of: (1) one or more new subframes, and (2) a new set of one or more subframes.

The apparatus further includes a means for repeating the aforementioned bitwise comparison for each file digital image in the matching set of file digital image sets.

In some preferred embodiments, a video detection method includes extracting a first feature data set common to a queried digital image set and for each of a first set of file digital image sets, measuring a first set of one or more error functions between the first feature data set for the queried digital image set and the first feature data set for each of the first set of file digital image sets, and generating a second set of file digital image sets. The second set consists of each of the first set of file digital image sets having a corresponding first set of one or more error functions less than a corresponding first set of thresholds. The aforementioned steps can be repeated until a final feature data set has been extracted, generating a matching set of file digital image sets.

In some preferred embodiments, the video detection method further includes comparing one or more subframes of a queried digital image in the queried digital image set to one or more sets of one or more subframes of a file digital image in the matching set of file digital image sets. Comparing is performed by a set of ordered pixels in an RGB color space, where the set of ordered pixels and the RGB color space are common to the queried digital image in the queried digital image set and to the file digital image in the matching set of file digital image sets.

In some preferred embodiments, the one or more subframes of the queried digital image are repeatedly translated, resized, and requantized to reduce one or more matching error functions of one or more subsets of the set of ordered pixels.

In some preferred embodiments, a match is detected if the one or more matching error functions is less than a corresponding matching set of thresholds. If no match is detected, the video detection method adds to the one or more sets of one or more subframes of the file digital image in the matching set of file digital image sets, one of: (1) one or more new subframes, and (2) a new set of one or more subframes. The aforementioned steps to detect matching subframes is repeated for each file digital image in the matching set of file digital image sets.

In some preferred embodiments, the first feature data set is extracted by a first function of two-dimensional statistical moments in a COLOR9 space of the queried digital image set. In some preferred embodiments, the first function comprises: temporally segmenting the queried digital image set into a set of segmented queried digital image subsets according to a distance measure of the set of two-dimensional statistical moments between consecutive queried digital images in the queried digital image set, and averaging the set of two-dimensional statistical moments for each segmented queried digital image subset.

In some preferred embodiments, measuring includes differencing the averaging with a corresponding key frame for each of the first set of file digital image sets. In some preferred embodiments, the set of two-dimensional statistical moments comprises at least one of: a mean, a variance, and a skew.

In some preferred embodiments, a second feature data set is extracted by a second function of two-dimensional statistical moments in a COLOR9 space of the queried digital image set. In some preferred embodiments, the second function comprises temporally segmenting the queried digital image set into a set of segmented queried digital image subsets according to a distance measure of the set of two-dimensional statistical moments between consecutive queried digital images in the queried digital image set, and temporally indexing the set of two-dimensional statistical moments for each segmented queried digital image subset.

In some preferred embodiments, measuring comprises convolving the temporal indexing with a set of corresponding segment frames for each of the first set of file digital image sets. In some preferred embodiments, the set of two-dimensional statistical moments comprises at least one of: a mean, a variance, and a skew.

In some preferred embodiments, a third feature data set is extracted as a set of two-dimensional wavelet transform coefficients in a COLOR9 space. The set of two-dimensional wavelet transform coefficients can be Haar transform coefficients. The COLOR9 space cab be transformed to a grey scale to facilitate the two-dimensional; wavelet transform.

In some preferred embodiments, comparing the set of ordered pixels is defined by the file digital image in the matching set of file digital image sets, and the set of ordered pixels comprises one or more sets of: a horizontal offset, a vertical offset, a horizontal segment length, and a vertical segment length.

In some preferred embodiments, translating, resizing, requantizing, and repeating to reduce the one or more matching error functions comprises one or more feedback loops. In some preferred embodiments, translating, resizing, requantizing, and repeating to reduce the one or more matching error functions comprises an edge detection and suppression function. In some preferred embodiments, detecting a match further comprises detecting a match if the one or more subsets of the set of ordered pixels is contiguous.

In some preferred embodiments, in the event no match is detected, the video detection method adds a subset of the one or more subframes of the queried digital image.

In some preferred embodiments, a video archiving method is used to automatically tag and store video clips. The video archiving method comprises encoding a video, importing the video to a set of file digital images, generating a set of video detection data from the set of file digital images, generating a set of video analysis data from the set of file digital images, generating a set of metadata from the set of file digital images, generating a set of manual annotation data based on the set of file digital images, and generating a set of video indexing data from the aforementioned generated data to archive the video.

A partially completed video method on a file digital image that yields demonstrably larger distances than a previously measured file digital image can direct the video detection apparatus to skip to a next file digital image, effectively inserting a data tree pruning step. A partially completed video method on a file digital image that yields demonstrably smaller distances than a previously measured file digital image can direct the video detection apparatus to store the file digital image under test, allowing the queried digital data representation to replace the previously measured filed digital image in the matching set of file digital images.

Prematurely aborting a search to replace a previously tested file digital image with the file digital image under test comprises one or more of: a deconvolution of a set of one or more matching errors from and a reassignment of thresholding levels.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

It should be appreciated that the particular implementations shown and described herein are examples of the present invention and are not intended to otherwise limit the scope of the present invention in any way. Further, the techniques are suitable for applications in teleconferencing, robotics vision, unmanned vehicles, or any other similar applications.

Video detection systems and processes according to the present invention are capable of comparing digital footage such as films, clips, and advertisements against digital media broadcasts from virtually any source. This enables automatic and efficient supervision of digital content. The video detection system is highly scalable and uses superior computer vision and signal processing technology for analyzing footage in the video and in the audio domain in real time.

Users can insert their reference content into the video detection system, and nominate one or more media sources such as different broadcast television channels or digital video streams for monitoring. The system then generates detailed statistics about appearances of the reference content within the monitored media sources. A copy of the broadcast footage is retained for confirmation purposes. The video detection is designed to operate without supervision around-the-clock. Minimizing the required amount of manual intervention, this allows virtually any source to be monitored in a very cost-effective way.

Moreover, the video detection system's automatic content-based identification technology is highly accurate. While human observers may err due to fatigue, or miss small details in the footage that are difficult to identify, video detection system is capable of detecting content with a proven accuracy of over 99%. This does not require prior inspection or manipulation of the footage to be monitored. The system extracts the relevant information from the video stream data itself and can therefore efficiently monitor a nearly unlimited number of channels without manual interaction.

The video detection system computes digital signatures—called fingerprints—from the reference content. These describe specific audiovisual aspects of the content, such as color distribution, shapes, patterns, and the frequency spectrum in the audio stream. Each piece of video has a unique fingerprint that is basically a compact digital representation of its unique audiovisual characteristics.

Figure 1:
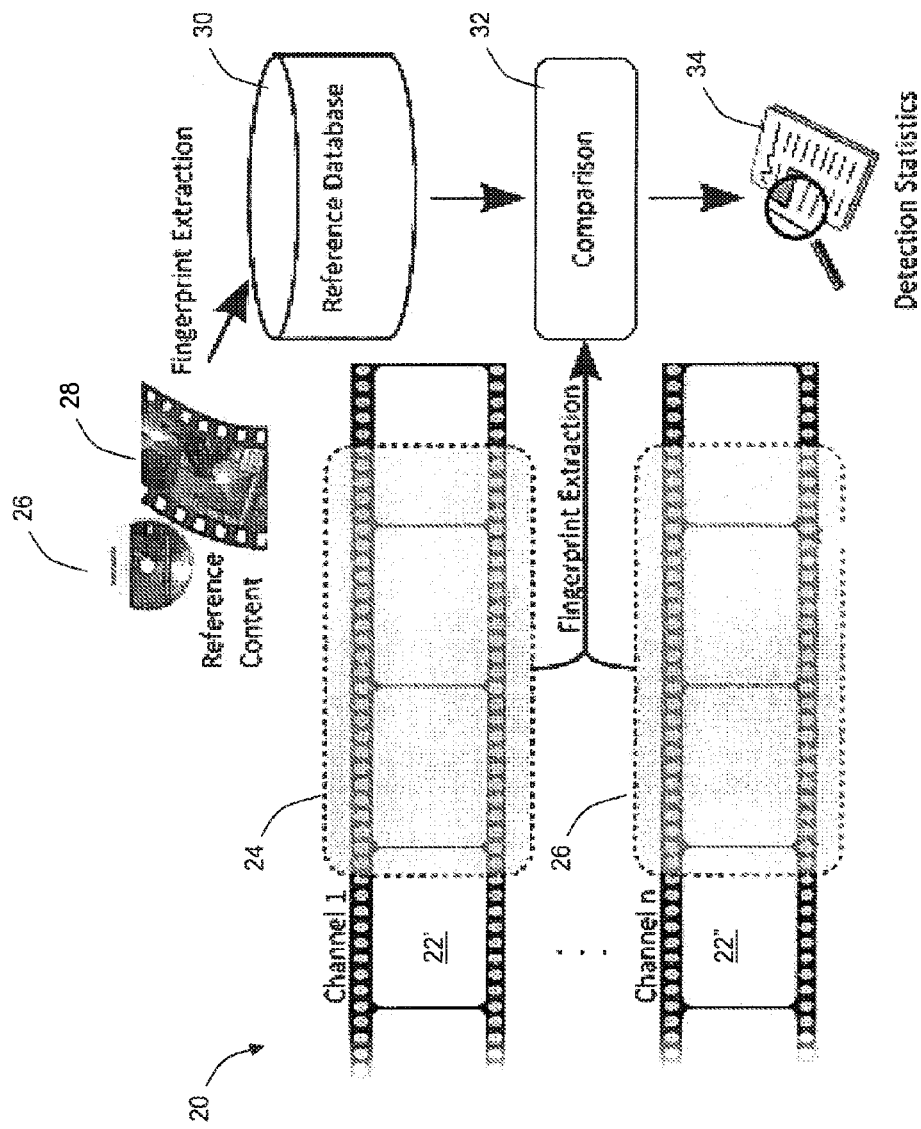
FIG. 1 shows a functional block diagram of an exemplary multi-channel video monitoring process in accordance with an embodiment of the present invention.

The fingerprints of the reference content are stored in a reference database along with all relevant meta-information. In a typical scenario, the video sources to be monitored are buffered by video detection signal acquisition units; fingerprints from these sources are extracted offline and then compared to the fingerprints in the reference database as illustrated in FIG. 1.

Figure 2:
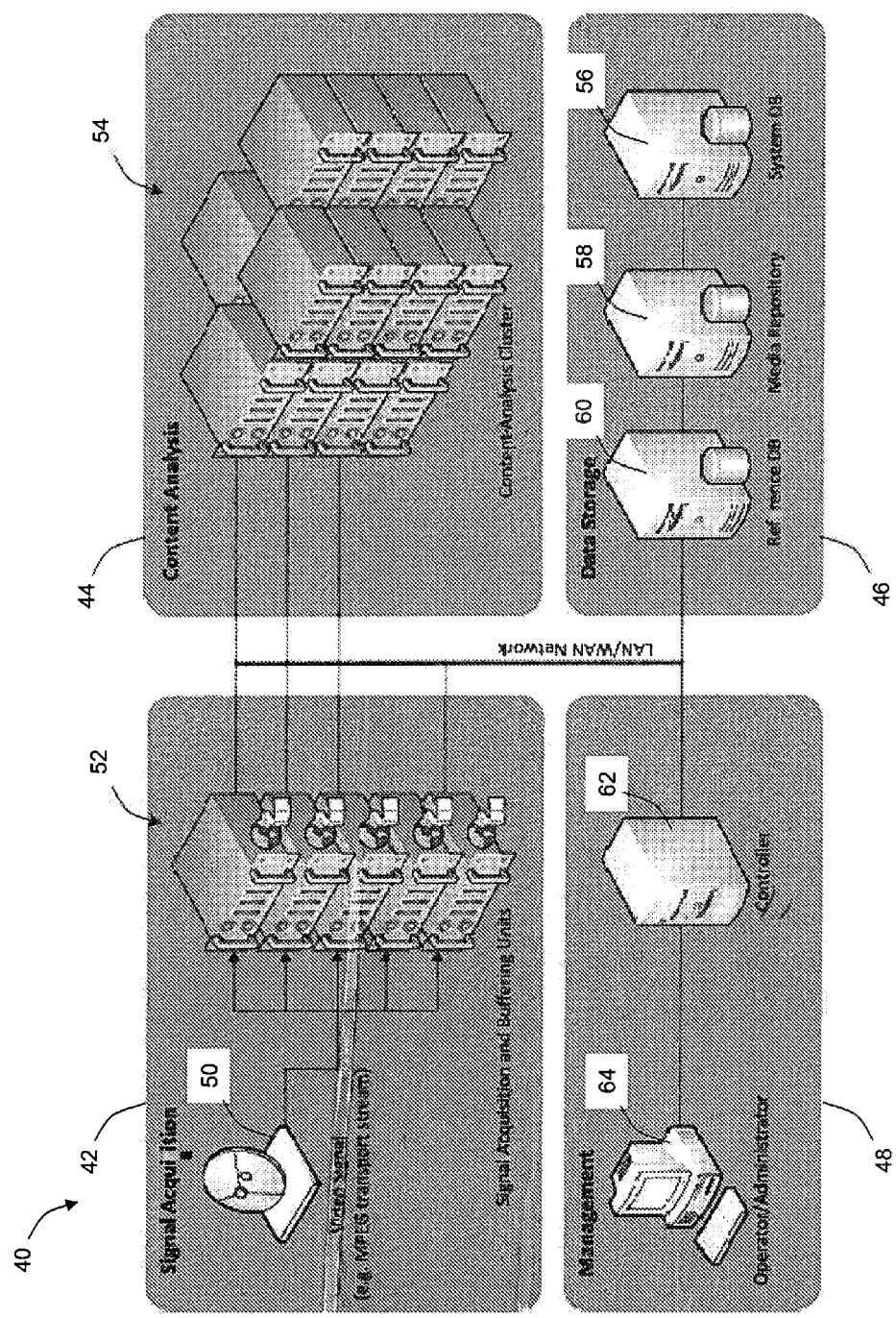
FIG. 2 shows a block diagram of an exemplary multi-channel video monitoring system in accordance with an embodiment of the present invention.

Video detection systems and processes use a fast multi-stage fingerprint comparison engine that reliably identifies any occurrence of the reference content in the video data stream that is being monitored. As part of the fingerprinting process, the system clusters similar frames that occur within close proximity as illustrated in FIG. 2. This results in the temporal segmentation of the video into small, visually coherent units, called shots. For each shot, one representative frame—a key frame—is selected that can be used for visualization in a storyboard. The fingerprints of the individual frames are combined to form the video fingerprint for the entire clip. The video detection systems and processes use these video fingerprints to identify if and when reference content or parts thereof appear in one of the video streams being monitored.

Within the matching process, the video detection system analyzes the footage to identify Regions of Interest (ROI). A region of interest occurs, for example, when reference content is not shown full-screen, but as a downsized version along with other content in a video. In such cases, the analysis engine is able to identify the region in which the reference content is shown, and disregards other content in subsequent processing steps.

System Overview. An exemplary video detection system 40 according to the present invention illustrated in FIG. 3 consists of at least four main subsystems: (i) a signal, or media acquisition subsystem 42, (ii) a content analysis subsystem 44, (iii) a data storage subsystem 46; and (iv) a management subsystem 48. The media acquisition subsystem 42 acquires one or more video signals 50 and for each signal, records it as data chunks on a number of signal buffer units 52. Depending on the use case, the buffer units 52 may perform fingerprint extraction as well, as described in more detail herein. This can be useful in a remote capturing scenario in which the very compact fingerprints are transmitted over a communications medium, such as the Internet, from a distant capturing site to a centralized content analysis site. The video detection system 40 and processes may also be integrated with existing signal acquisition solutions, as long as the recorded data is accessible through a network connection.

The fingerprint for each data chunk can be stored in a media repository 58 portion of the data storage subsystem 46. In some embodiments, the data storage subsystem 46 includes one or more of a system repository 56 and a reference repository 60. One ore more of the repositories 56, 58, 60 of the data storage subsystem 46 can include one or more local hard-disk drives, network accessed hard-disk drives, optical storage units, random access memory (RAM) storage drives, and combinations thereof. One ore more of the repositories 56, 58, 60 can include a database management system to facilitate storage and access of stored content. In some embodiments, the system 40 supports different SQL-based relational database systems through its database access layer, such as Oracle and Microsoft-SQL Server. Such a system database acts as a central repository for all metadata generated during operation, including processing, configuration, and status information.

In some embodiments, the media repository 58 is serves as the main payload data storage of the system 40 storing the fingerprints, along with their corresponding key frames. A low quality version of the processed footage associated with the stored fingerprints is also stored in the media repository 58. The media repository 58 can be implemented using one or more RAID systems that can be accessed as a networked file system.

Each of the data chunk can become an analysis task that is scheduled for processing by a controller 62 of the management subsystem 48. The controller 62 is primarily responsible for load balancing and distribution of jobs to the individual nodes in a content analysis cluster 54 of the content analysis subsystem 44. In at least some embodiments, the management subsystem 48 also includes an operator/administrator terminal, referred to generally as a front-end 64. The operator/administrator terminal 64 can be used to configure one or more elements of the video detection system 40. The operator/administrator terminal 64 can also be used to upload reference video content for comparison and to view and analyze results of the comparison.

Figure 3:
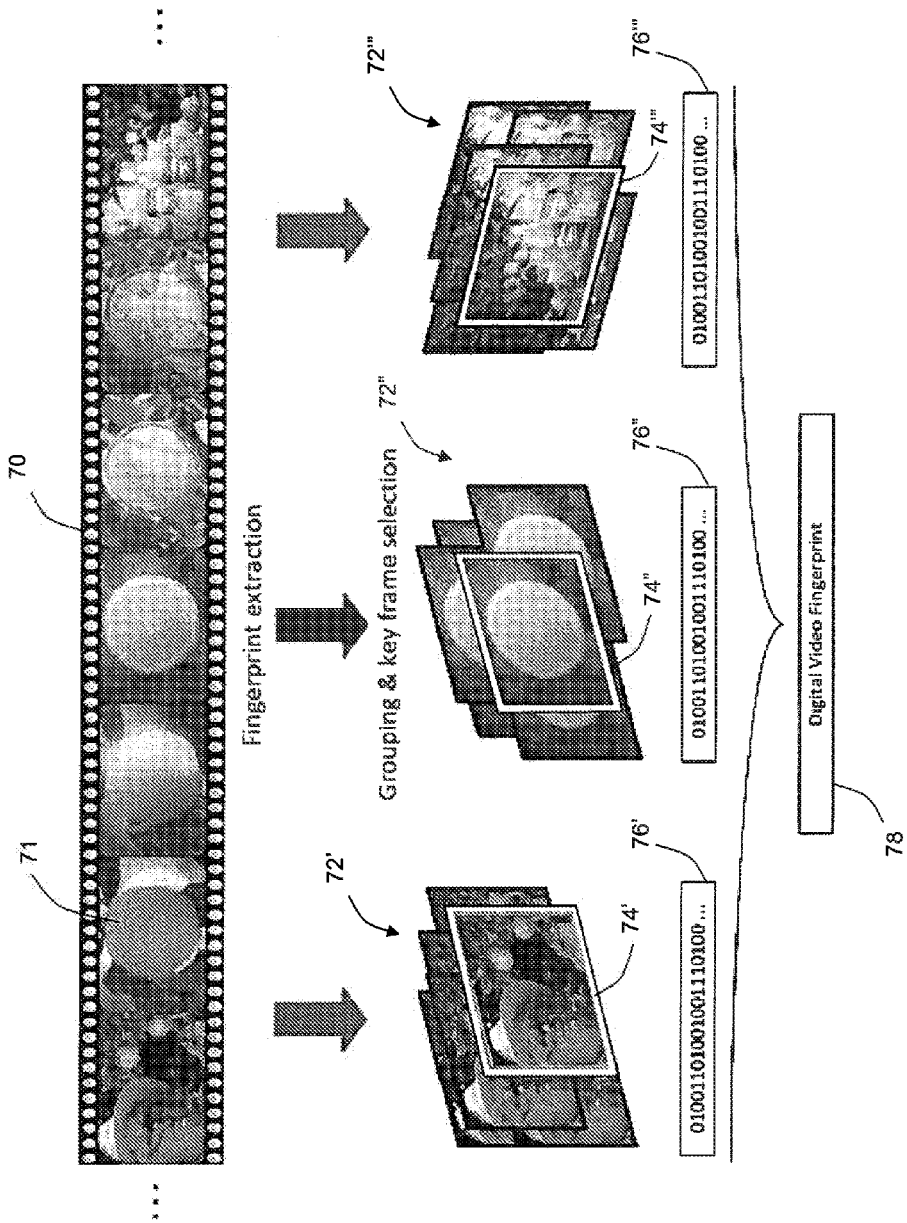
FIG. 3 is a diagram illustrating generation of a digital video fingerprint in accordance with an embodiment of the present invention.

As shown in FIG. 3, the content analysis units fetch the recorded data chunks from the signal buffer units directly and extract fingerprints prior to the analysis. The system 40 (FIG. 2) receives one or more video (and more generally audiovisual) clips or segments 70, each including a respective series of image frames 71. The image frames are highly redundant, with groups frames varying from each other according to different shots of the video segment 70. In the exemplary video segment 70, sampled frames of the video segment are grouped according to shot: a first shot 72', a second shot 72", and a third shot 72'''. A representative, or key frame 74', 74", 74''' (generally 74) is selected for each of the different shots 72', 72", 72''' (generally 72). The system 40 determines a respective digital signature 76', 76", 76''' (generally 76) for each of the different key frames 74. The group of digital signatures 76 for the key frames 74 together represent a digital video fingerprint of the exemplary video segment 70.

After processing several such data chunks 70, the detection results for these chunks are stored in the system database 56 (FIG. 2). Beneficially, the numbers and capacities of signal buffer units 52 (FIG. 2) and content analysis nodes 54 (FIG. 2) may flexibly be scaled to customize the system's capacity to specific use cases of any kind. Realizations of the system 40 can include multiple software components that can be combined and configured to suit individual needs. Depending on the specific use case, several components can be run on the same hardware. Alternatively or in addition, components can be run on individual hardware for better performance and improved fault tolerance. Such a modular system architecture allows customization to suit virtually every possible use case. From a local, single-PC solution to nationwide monitoring systems, fault tolerance, recording redundancy, and combinations thereof System operators or data analysts may use the front-end 40 (FIG. 2) to review detection results, manage reference content, and monitor the system's status.

Several auxiliary tools may be added to the core system, such as a ClipCutter utility to extract and insert new reference clips into the database, and a RetroMatch tool that allows offline matching reference clips against previously recorded footage.

In some embodiments the video detection system and process can be installed as a Web portal solution. Web portal implementations allow for flexible, on demand monitoring offered as a service. With need for little more than web access, a web portal implementation allows clients with small reference data volumes to benefit from the advantages of the video detection systems and processes of the present invention. Solutions can offer one or more of several programming interfaces using Microsoft .Net Remoting for seamless in-house integration with existing applications. Alternatively or in addition, long-term storage for recorded video data and operative redundancy can be added by installing a secondary controller and secondary signal buffer units.

Referring again to FIG. 2, the signal buffer units 52 can be implemented to operate around-the-clock without any user interaction necessary. In such embodiments, the continuous video data stream is captured, divided into manageable segments, or chunks, and stored on internal hard disks. The hard disk space can be implanted to function as a circular buffer. In this configuration, older stored data chunks can be moved to a separate long term storage unit for archival, freeing up space on the internal hard disk drives for storing new, incoming data chunks. Such storage management provides reliable, uninterrupted signal availability over very long periods of time (e.g., hours, days, weeks). The controller 62 is configured to ensure timely processing of all data chunks so that no data is lost. The signal acquisition units 52 are designed to operate without any network connection, if required, (e.g., during periods of network interruption) to increase the system's fault tolerance.

In some embodiments, the signal buffer units 52 perform fingerprint extraction and transcoding on the recorded chunks locally. Storage requirements of the resulting fingerprints are trivial compared to the underlying data chunks and can be stored locally along with the data chunks. This enables transmission of the very compact fingerprints including a storyboard over limited-bandwidth networks, to avoid transmitting the full video content.

In some embodiments, the controller 62 manages processing of the data chunks recorded by the signal buffer units 52. The controller 62 constantly monitors the signal buffer units 52 and content analysis nodes 54, performing load balancing as required to maintain efficient usage of system resources. For example, the controller 62 initiates processing of new data chunks by assigning analysis jobs to selected ones of the analysis nodes 54. In some instances, the controller 62 automatically restarts individual analysis processes on the analysis nodes 54, or one or more entire analysis nodes 54, enabling error recovery without user interaction. A graphical user interface, can be provided at the front end 64 for monitor and control of one or more subsystems 42, 44, 46 of the system 40. For example, the graphical user interface allows a user to configure, reconfigure and obtain status of the content analysis 44 subsystem.

In some embodiments, the analysis cluster 44 includes one or more analysis nodes 54 as workhorses of the video detection and monitoring system. Each analysis node 54 independently processes the analysis tasks that are assigned to them by the controller 62. This primarily includes fetching the recorded data chunks, generating the video fingerprints, and matching of the fingerprints against the reference content. The resulting data is stored in the media repository 58 and in the data storage subsystem 46. The analysis nodes 54 can also operate as one or more of reference clips ingestion nodes, backup nodes, or RetroMatch nodes, in case the system performing retrospective matching. Generally, all activity of the analysis cluster is controlled and monitored by the controller.

Figure 4:
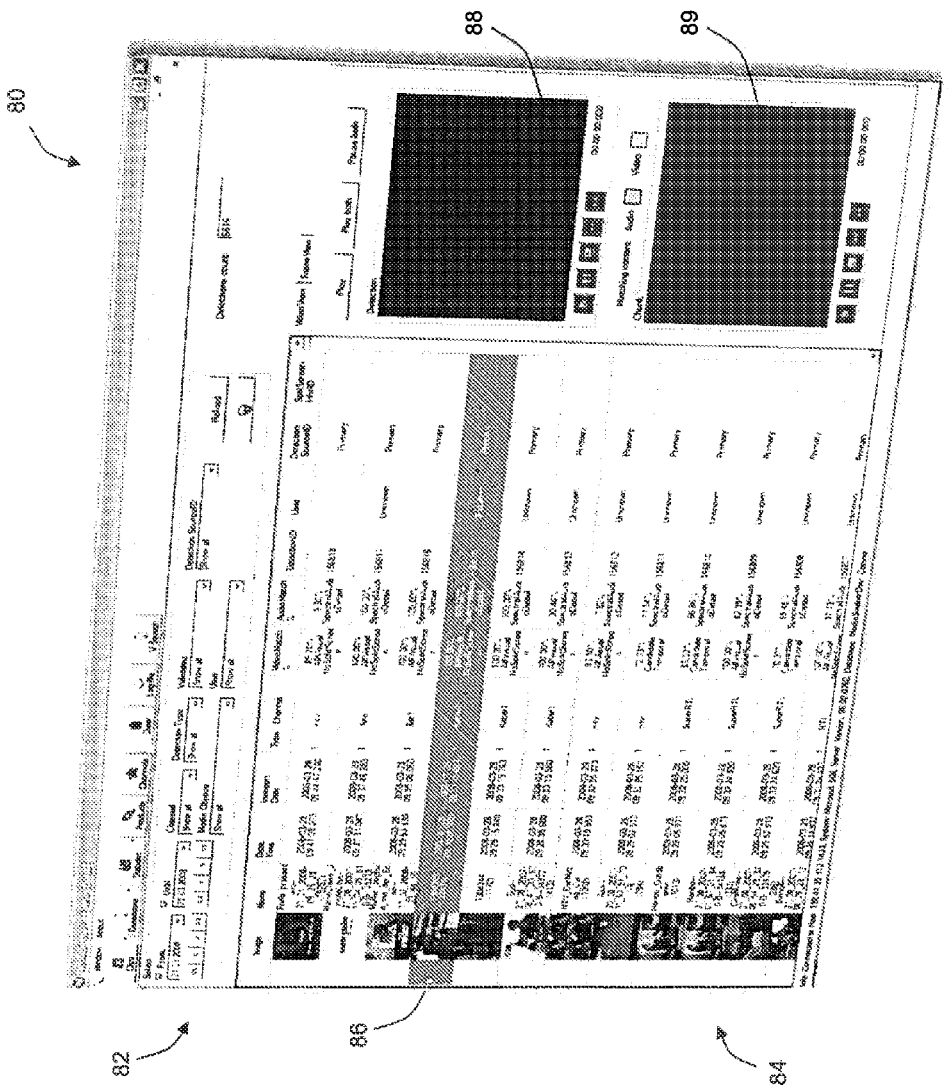
FIG. 4 shows a screen shot of an exemplary graphical user interface to a multi-channel video monitoring system, in accordance with an embodiment of the present invention.

A screen shot 80 of an exemplary main graphical user interface (GUI) for operators, data annalists, and other users is illustrated in FIG. 4. The video detection and comparison GUI 80 enables users to review detections, manage reference content, edit clip metadata, play reference and detected footage, and perform detailed comparison between reference and detected content. In some embodiments, the system 40 includes or more different graphical user interfaces, for different functions and/or subsystems such as the a recording selector, and a controller front-end 64.

A portal is a web-based end-user interface to the system for offering on demand content detection as a service. The portal targets customers with smaller amounts of reference content, such as small to midsize advertising agencies, content owners, or PR firms. Clients can log in, upload their reference content, and select the channels they wish to be monitored for a designated time span. Detailed detection reports may be viewed online at any time, and email notifications can be sent every time reference content has been aired. In addition, the portal offers advanced functionality such as RSS feeds, metadata access, download of detection reports in Microsoft-Excel or XML format, and detailed clip difference visualization just like the GUI front-end.

The video detection and comparison GUI 80 includes one or more user-selectable controls 82, such as standard window control features. The GUI 80 also includes a detection results table 84. In the exemplary embodiment, the detection results table 84 includes multiple rows 60, one row for each detection. The row 60 includes a low-resolution version of the stored image together with other information related to the detection itself. Generally, a name or other textual indication of the stored image can be provided next to the image. The detection information can include one or more of: date and time of detection; indicia of the channel or other video source; indication as to the quality of a match; indication as to the quality of an audio match; date of inspection; a detection identification value; and indication as to detection source. In some embodiments, the GUI 80 also includes a video viewing window 88 for viewing one or more frames of the detected and matching video. alternatively or in addition, the GUI 80 also includes an audio viewing window 89 for comparing indicia of an audio comparison.

Figure 5:
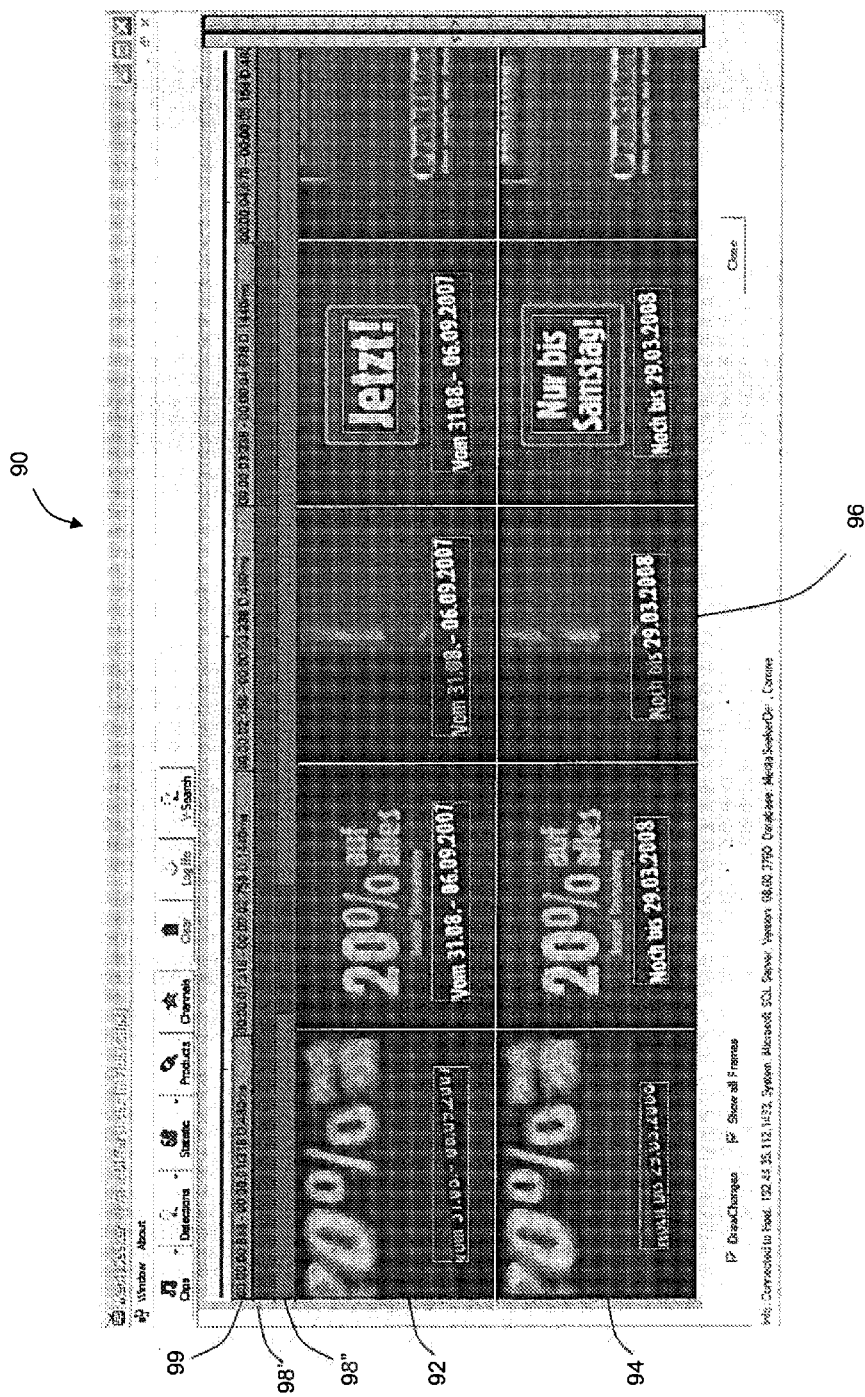
FIG. 5 shows a screen shot of an exemplary detailed clip comparison provided by a graphical user interface to a multi-channel video monitoring system, in accordance with an embodiment of the present invention.

Often published content differs slightly from the original reference content. while this content will still be detected, the system will not report a 100% match. In these cases, users may examine the changes between reference and detection in detail using the an exemplary graphical user interface 90 for comparative analysis, shown in FIG. 5. The reference content is shown in the upper row 92, key frame 96 by key frame 96, and compared to the detected content in the lower row 94. Visual differences are highlighted using colored boxes. Differences in the audio track can be visualized as color-distinguishable bars (e.g., red and green bars) 98', 98" shown above the key frames 96 and may be evaluated by playing both reference and detected footage side-by-side through the user interface 90. In some embodiments, the front-end 64 (FIG. 2) provides a components-based graphical user interface that is customizable to satisfy individual requirements. Functionality such user administration and system monitoring may be added if required.

Figure 6:
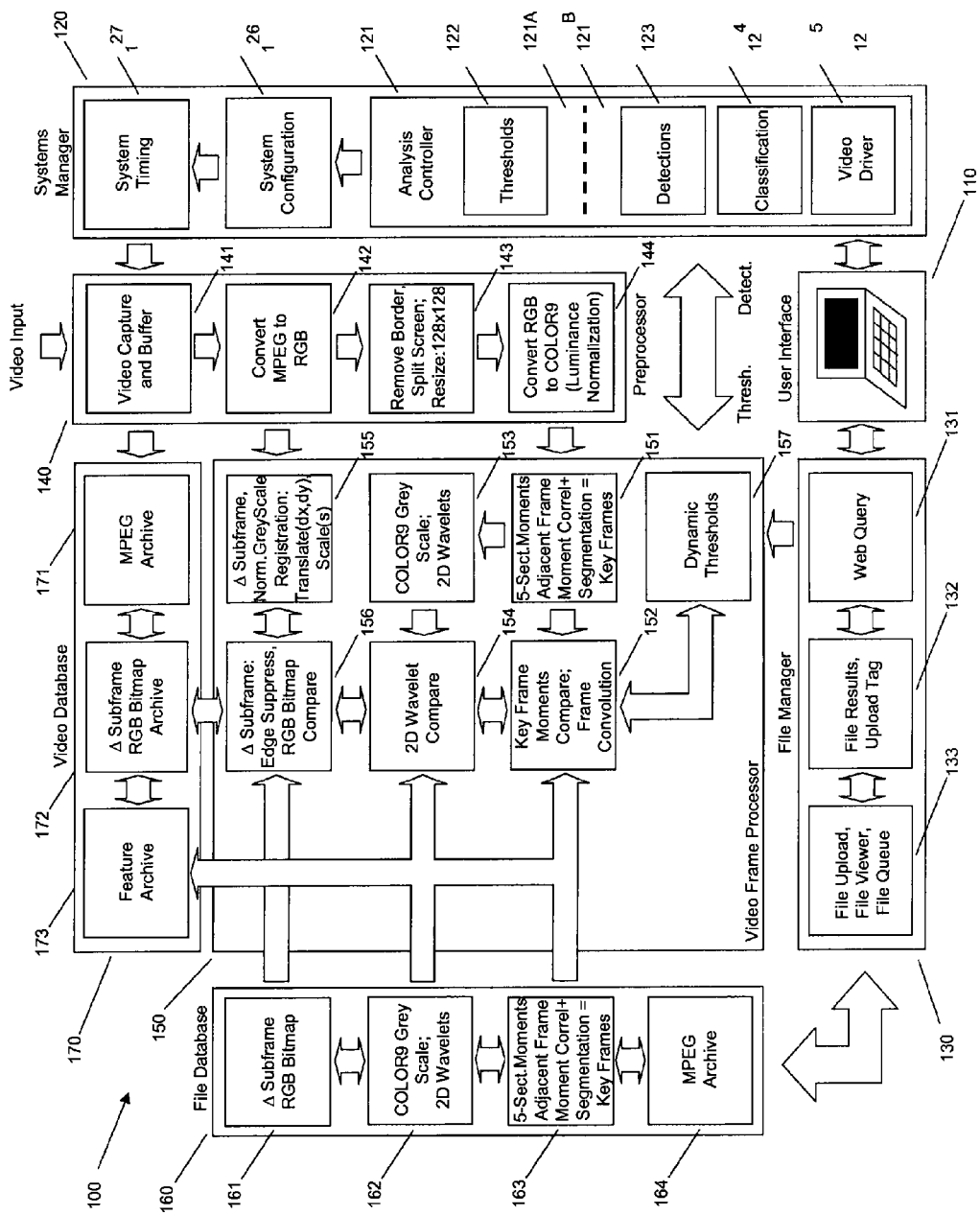
FIG. 6 shows a system block diagram of an exemplary digital video image detection and matching system in accordance with an embodiment of the present invention.

Referring now to FIG. 6, a system block diagram 100 is shown in more detail for an exemplary digital video image detection and matching system according to an embodiment of the present invention. The system block diagram 100 includes a user interface 110, a systems manager 120, a file manager 130, a preprocessor 140, a video frame processor 150, a file database 160, and a video database 170.

The user interface 110 communicates directly with the systems manager 120 and the file manager 130. The systems manager 130 includes an analysis controller 121 and elements to provide for a system configuration 126 and for system timing functions 127. The analysis controller 121 includes an input analysis controller 121A and an output analysis controller 121B. The input analysis controller 121A includes an element to provide a threshold set 122. The output analysis controller includes a detector 123, a classifier 124, and a video driver 125.

The threshold set 122 is used as a system input to determine one or more feature set thresholds. In some embodiments, the threshold set 122 determines feature thresholds manually, based on input from the user interface 110. In some embodiments, the threshold set 122 determines feature thresholds automatically. In some embodiments, the threshold set 122 determines feature thresholds manually and automatically.

A set of video match output data is received by the detector 123 and the classifier 124. The detector 123 registers results of the video match output data. The classifier 124 classifies results of the video match output data. The video driver 125 displays results and classifications of the video match output data.

The system configuration 126 and system timing 127 elements of the systems manager 120 communicate with the preprocessor 140. The system configuration 126 determines a firmware configuration to capture an MPEG video input stream. The system timing 127 determines a video capture rate and a video capture period for the MPEG video input stream.

The user interface 110 communicates with a file manager 130 to upload at least one video file to compare to a queried video input. The file manager includes a web query 131, an upload tag 132, and a file upload function and queue 133. The web query 131, upload tag 132, and file upload function 133 are selected by a user at the user interface 110.

A preprocessor 140 includes an element for an MPEG video capture and buffer 141, an element for video conversion from an MPEG digital image representation to an RGB digital image representation 142, an element for a removal of borders, split screens, and a video resize 143, and an element for a video conversion from an RGB digital image representation to an COLOR9 digital image representation 144.

The preprocessor 140 communicates with the video frame processor 150. The video frame processor 150 includes an element for low resolution temporal feature extraction 151, wherein low resolution temporal feature extraction includes a method to calculate low resolution temporal moments, and an element to compare the low resolution temporal moments to an existing database 152. The video frame processor 150 further includes, in the same element, an element for high resolution feature extraction 151, wherein high resolution feature extraction includes a method to calculate high resolution temporal moments, and an element to compare the high resolution temporal moments to an existing database 152. The video frame processor 150 further includes a method to calculate 2D wavelet transform coefficients 153, and an element to compare the 2D wavelet transform coefficients to an existing database 154.

The video frame processor 150 further includes an element to convert an RGB digital image representation subframe to a normalized grey scale digital image representation subframe and compare the normalized grey scale digital image representation subframe to an existing database 155, wherein the comparing includes a registration in translation (dx, dy) and scaling (s) of the normalized grey scale digital image representation subframe to the existing database, and an element to bitwise compare the RGB digital image representation subframe to an existing database 156, wherein the comparing includes an edge detection and suppression algorithm to eliminate residual registration error. The RGB digital image representation subframe is determined by the existing database.

The video frame processor 150 further includes an element to set dynamic thresholds 157 for compare elements 152, 154, and 156.

The file database 160 includes a video frame relational database, cross referenced by an RGB digital image representation subframe archive 161, a 2D wavelet transform coefficient archive 162, a low resolution temporal moments and high resolution temporal moments archive 163, and an MPEG archive 164.

The file database 160 elements 161, 162, and 163 directly feed the video frame processor 150 elements 156, 154, and 152, respectively. The file database 160 elements 161, 162, and 163 are calculated from the MPEG archive 164 in an identical manner as the video frame processor elements 155, 153, and 151, respectively, are calculated from the preprocessor 140 element for MPEG video capture and buffer 141, wherein calculations for 155, 153, and 151 are distributed between the preprocessor 140 and the video frame processor 150.

A video database 170 includes a video frame relational database, cross referenced by an MPEG archive 171, an RGB digital image representation subframe archive 172, and a features archive 173, wherein the feature archive includes low and high resolution features. The video database 170 elements 171, 172, and 173 are populated by preprocessor 140 element 141, the video frame processor 150 elements 155 and 156, and the video frame processor 150 elements 151-154, respectively. The video database 170 is populated as determined by the systems manager 120 system configuration 126, which is selected by the user at the user interface 110.

Figure 7:
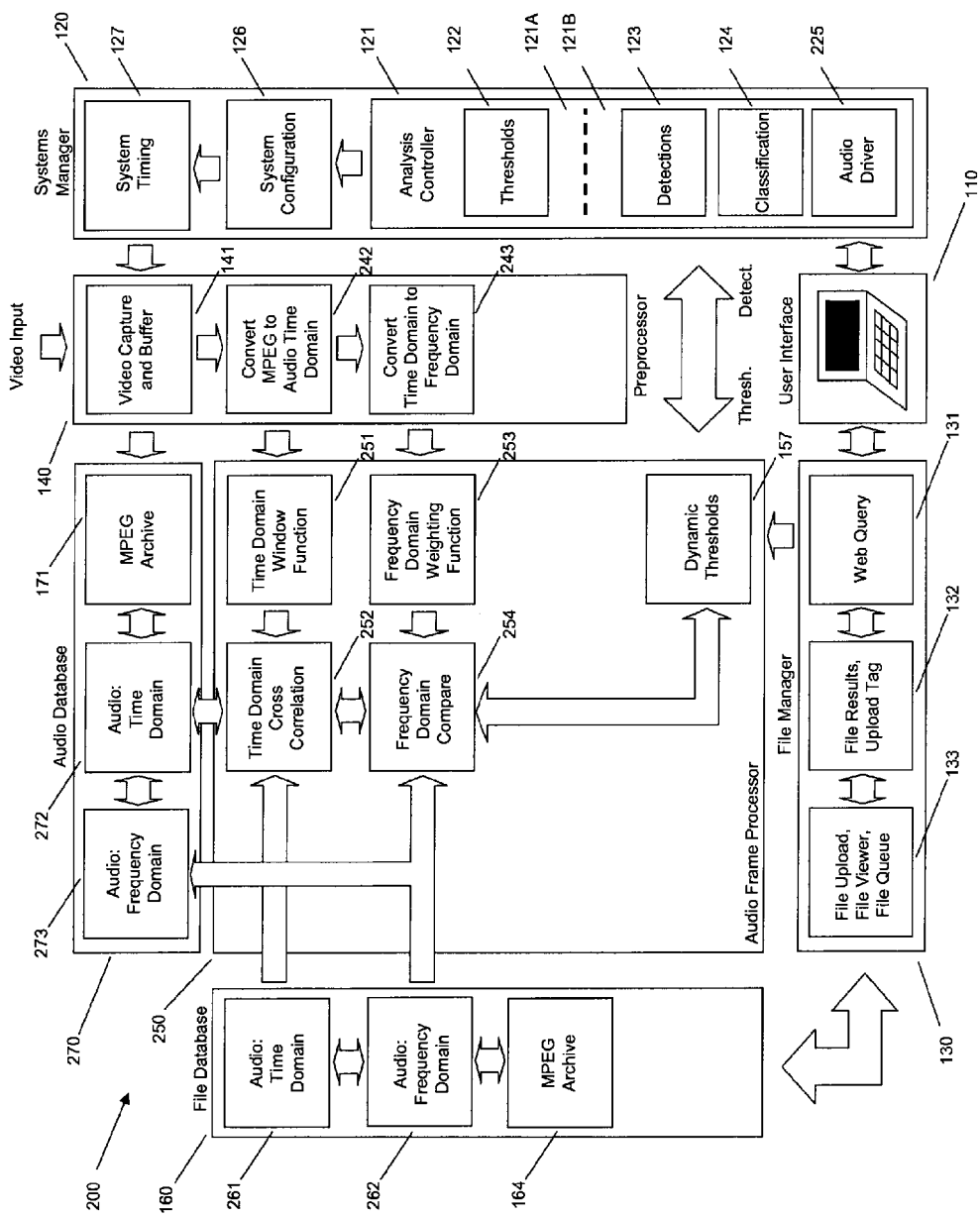
FIG. 7 shows a system block diagram of an exemplary audio video detection and matching system in accordance with an embodiment of the present invention.

FIG. 7 shows a system block diagram 200 for an audio video detection and matching system according to a first embodiment of the present invention. The system block diagram 100 includes a user interface 110, a systems manager 120, a file manager 130, a preprocessor 140, a video frame processor 150, a file database 160, and an audio database 270.

The user interface 110 communicates directly with the systems manager 120 and the file manager 130. The systems manager 130 includes an analysis controller 121 and elements to provide for a system configuration 126 and for system timing functions 127. The analysis controller 121 includes an input analysis controller 121A and an output analysis controller 121B. The input analysis controller 121A includes an element to provide a threshold set 122. The output analysis controller includes a detector 123, a classifier 124, and a audio driver 225.

The threshold set 122 is used as a system input to determine one or more feature set thresholds. In some embodiments, the threshold set 122 determines feature thresholds manually, based on input from the user interface 110. In some embodiments, the threshold set 122 determines feature thresholds automatically. In some embodiments, the threshold set 122 determines feature thresholds manually and automatically.

A set of audio match output data is received by the detector 123 and the classifier 124. The detector 123 registers results of the audio match output data. The classifier 124 classifies results of the audio match output data. The audio driver 125 plays results and classifications of the audio match output data.

The system configuration 126 and system timing 127 elements of the systems manager 120 communicate with the preprocessor 140. The system configuration 126 determines a firmware configuration to capture an MPEG video input stream. The system timing 127 determines a video capture rate and a video capture period for the MPEG video input stream.

The user interface 110 communicates with a file manager 130 to upload at least one audio file to compare to a queried audio input. The file manager includes a web query 131, an upload tag 132, and a file upload function and queue 133. The web query 131, upload tag 132, and file upload function 133 are selected by a user at the user interface 110.

A preprocessor 140 includes an element for an MPEG video capture and buffer 141, an element for a conversion from an MPEG digital image representation to an audio time domain representation 242, and an element for a conversion from the audio time domain representation to an audio frequency domain representation 243.

The preprocessor 140 communicates with the audio frame processor 250. The audio frame processor 250 includes an element for windowing the audio time domain representation 251, and an element to cross correlate the audio time domain representation to an existing database 252. The audio frame processor 250 further includes an element to weight the audio frequency domain representation 253, and an element to compare the weighted audio frequency domain representation to an existing database 254.

The audio frame processor 250 further includes an element to set dynamic thresholds 157 for compare elements 252 and 154.

The file database 160 includes an audio frame relational database, cross referenced by an audio time domain representation archive 261, an audio frequency domain representation archive 262, and an MPEG archive 164.

The file database 160 elements 261 and 262 map directly onto the audio frame processor 250 elements 252 and 254, respectively. The file database 160 elements 261 and 262 are calculated from the MPEG archive 164 in an identical manner as the audio frame processor elements 251 and 153, respectively, are calculated from the preprocessor 140 element for MPEG video capture and buffer 141, wherein calculations for 251 and 253 are distributed between the preprocessor 140 and the audio frame processor 250.

A audio database 270 includes an audio frame relational database, cross referenced by an MPEG archive 171, an audio time domain representation archive 272, and an audio frequency domain representation archive 273. The audio database 270 elements 171, 272, and 273 are populated by the preprocessor 140 element 141 and the audio frame processor 250 elements 251 and 253, respectively. The audio database 270 is populated as determined by the systems manager 120 system configuration 126, which is selected by the user at the user interface 110.

Figure 8:
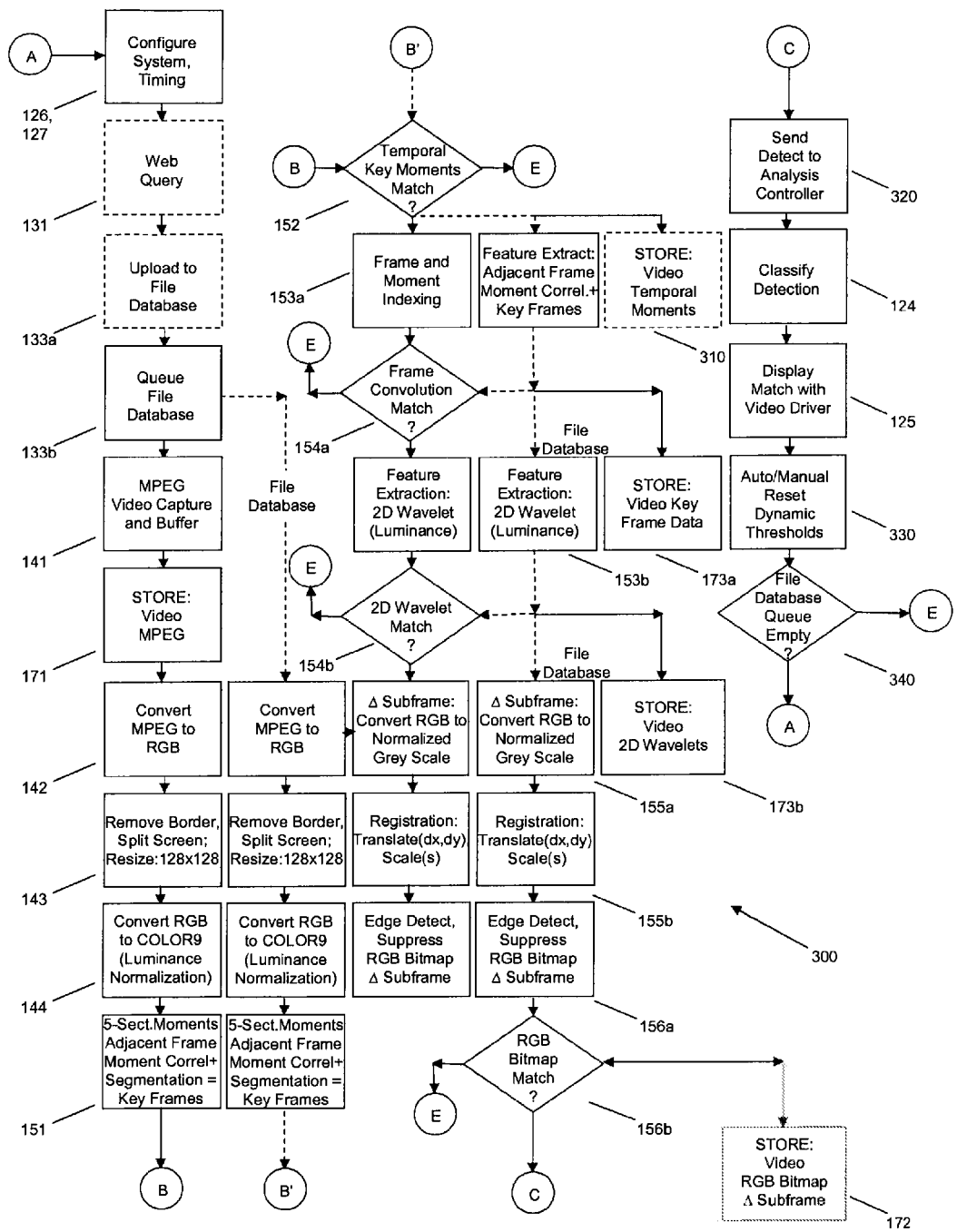
FIG. 8 shows a flow chart for an exemplary video detection process in accordance with an embodiment of the present invention.

FIG. 8 shows a method flow chart 300 for a digital video image detection system 100 in accordance with a first embodiment of the present invention. The method flow chart 300 initiates at a start point A with a user at a user interface 110 configuring the digital video image detection system 126, wherein configuring the system includes selecting at least one channel, at least one decoding method, and a channel sampling rate, a channel sampling time, and a channel sampling period. Configuring the system 126 includes one of: configuring the digital video image detection system manually and semi-automatically. Configuring the system 126 semi-automatically includes one or more of: selecting channel presets, scanning scheduling codes, and receiving scheduling feeds.

Configuring the digital video image detection system 126 further includes generating a timing control sequence 127, wherein a set of signals generated by the timing control sequence 127 provide for an interface to an MPEG video receiver.

In some embodiments, the method flow chart 300 for the digital video image detection system 100 provides a step to optionally query the web for a file image 131 for the digital video image detection system 100 to match. In some embodiments, the method flow chart 300 provides a step to optionally upload from the user interface 100 a file image for the digital video image detection system 100 to match. In some embodiments, querying and queuing a file database 133b provides for at least one file image for the digital video image detection system 100 to match.

The method flow chart 300 further provides steps for capturing and buffering an MPEG video input at the MPEG video receiver and for storing the MPEG video input 171 as a digital image representation in an MPEG video archive.

The method flow chart 300 further provides for steps of: converting the MPEG video image to a plurality of query digital image representations, converting the file image to a plurality of file digital image representations, wherein the converting the MPEG video image and the converting the file image are comparable methods, and comparing and matching the queried and file digital image representations. Converting the file image to a plurality of file digital image representations is provided by one of: converting the file image at the time the file image is uploaded, converting the file image at the time the file image is queued, and converting the file image in parallel with converting the MPEG video image.

The method flow chart 300 provides for a method 142 for converting the MPEG video image and the file image to a queried RGB digital image representation and a file RGB digital image representation, respectively. In some embodiments, converting method 142 further comprises removing an image border 143 from the queried and file RGB digital image representations. In some embodiments, the converting method 142 further comprises removing a split screen 143 from the queried and file RGB digital image representations. In some embodiment, one or more of removing an image border and removing a split screen 143 includes detecting edges. In some embodiments, converting method 142 further comprises resizing the queried and file RGB digital image representations to a size of 128×128 pixels.

The method flow chart 300 further provides for a method 144 for converting the MPEG video image and the file image to a queried COLOR9 digital image representation and a file COLOR9 digital image representation, respectively. Converting method 144 provides for converting directly from the queried and file RGB digital image representations.

Converting method 144 includes steps of: projecting the queried and file RGB digital image representations onto an intermediate luminance axis, normalizing the queried and file RGB digital image representations with the intermediate luminance, and converting the normalized queried and file RGB digital image representations to a queried and file COLOR9 digital image representation, respectively.

The method flow chart 300 further provides for a method 151 for converting the MPEG video image and the file image to a queried 5-segment, low resolution temporal moment digital image representation and a file 5-segment, low resolution temporal moment digital image representation, respectively. Converting method 151 provides for converting directly from the queried and file COLOR9 digital image representations.

Converting method 151 includes steps of: sectioning the queried and file COLOR9 digital image representations into five spatial, overlapping sections and non-overlapping sections, generating a set of statistical moments for each of the five sections, weighting the set of statistical moments, and correlating the set of statistical moments temporally, generating a set of key frames or shot frames representative of temporal segments of one or more sequences of COLOR9 digital image representations.

Generating the set of statistical moments for converting method 151 includes generating one or more of: a mean, a variance, and a skew for each of the five sections. In some embodiments, correlating a set of statistical moments temporally for converting method 151 includes correlating one or more of a means, a variance, and a skew of a set of sequentially buffered RGB digital image representations.

Correlating a set of statistical moments temporally for a set of sequentially buffered MPEG video image COLOR9 digital image representations allows for a determination of a set of median statistical moments for one or more segments of consecutive COLOR9 digital image representations. The set of statistical moments of an image frame in the set of temporal segments that most closely matches the a set of median statistical moments is identified as the shot frame, or key frame. The key frame is reserved for further refined methods that yield higher resolution matches.

The method flow chart 300 further provides for a comparing method 152 for matching the queried and file 5-section, low resolution temporal moment digital image representations. In some embodiments, the first comparing method 151 includes finding an one or more errors between the one or more of: a mean, variance, and skew of each of the five segments for the queried and file 5-section, low resolution temporal moment digital image representations. In some embodiments, the one or more errors are generated by one or more queried key frames and one or more file key frames, corresponding to one or more temporal segments of one or more sequences of COLOR9 queried and file digital image representations. In some embodiments, the one or more errors are weighted, wherein the weighting is stronger temporally in a center segment and stronger spatially in a center section than in a set of outer segments and sections.

Comparing method 152 includes a branching element ending the method flow chart 300 at 'E' if the first comparing results in no match. Comparing method 152 includes a branching element directing the method flow chart 300 to a converting method 153 if the comparing method 152 results in a match.

In some embodiments, a match in the comparing method 152 includes one or more of: a distance between queried and file means, a distance between queried and file variances, and a distance between queried and file skews registering a smaller metric than a mean threshold, a variance threshold, and a skew threshold, respectively. The metric for the first comparing method 152 can be any of a set of well known distance generating metrics.

A converting method 153a includes a method of extracting a set of high resolution temporal moments from the queried and file COLOR9 digital image representations, wherein the set of high resolution temporal moments include one or more of: a mean, a variance, and a skew for each of a set of images in an image segment representative of temporal segments of one or more sequences of COLOR9 digital image representations.

Converting method 153a temporal moments are provided by converting method 151. Converting method 153a indexes the set of images and corresponding set of statistical moments to a time sequence. Comparing method 154a compares the statistical moments for the queried and the file image sets for each temporal segment by convolution.

The convolution in comparing method 154a convolves the queried and filed one or more of: the first feature mean, the first feature variance, and the first feature skew. In some embodiments, the convolution is weighted, wherein the weighting is a function of chrominance. In some embodiments, the convolution is weighted, wherein the weighting is a function of hue.

The comparing method 154a includes a branching element ending the method flow chart 300 if the first feature comparing results in no match. Comparing method 154a includes a branching element directing the method flow chart 300 to a converting method 153b if the first feature comparing method 153a results in a match.

In some embodiments, a match in the first feature comparing method 153a includes one or more of: a distance between queried and file first feature means, a distance between queried and file first feature variances, and a distance between queried and file first feature skews registering a smaller metric than a first feature mean threshold, a first feature variance threshold, and a first feature skew threshold, respectively. The metric for the first feature comparing method 153a can be any of a set of well known distance generating metrics.

The converting method 153b includes extracting a set of nine queried and file wavelet transform coefficients from the queried and file COLOR9 digital image representations. Specifically, the set of nine queried and file wavelet transform coefficients are generated from a grey scale representation of each of the nine color representations comprising the COLOR9 digital image representation. In some embodiments, the grey scale representation is approximately equivalent to a corresponding luminance representation of each of the nine color representations comprising the COLOR9 digital image representation. In some embodiments, the grey scale representation is generated by a process commonly referred to as color gamut sphering, wherein color gamut sphering approximately eliminates or normalizes brightness and saturation across the nine color representations comprising the COLOR9 digital image representation.

In some embodiments, the set of nine wavelet transform coefficients are one of: a set of nine one-dimensional wavelet transform coefficients, a set of one or more non-collinear sets of nine one-dimensional wavelet transform coefficients, and a set of nine two-dimensional wavelet transform coefficients. In some embodiments, the set of nine wavelet transform coefficients are one of: a set of Haar wavelet transform coefficients and a two-dimensional set of Haar wavelet transform coefficients.

The method flow chart 300 further provides for a comparing method 154b for matching the set of nine queried and file wavelet transform coefficients. In some embodiments, the comparing method 154b includes a correlation function for the set of nine queried and filed wavelet transform coefficients. In some embodiments, the correlation function is weighted, wherein the weighting is a function of hue; that is, the weighting is a function of each of the nine color representations comprising the COLOR9 digital image representation.

The comparing method 154b includes a branching element ending the method flow chart 300 if the comparing method 154b results in no match. The comparing method 154b includes a branching element directing the method flow chart 300 to an analysis method 155a-156b if the comparing method 154b results in a match.

In some embodiments, the comparing in comparing method 154b includes one or more of: a distance between the set of nine queried and file wavelet coefficients, a distance between a selected set of nine queried and file wavelet coefficients, and a distance between a weighted set of nine queried and file wavelet coefficients.

The analysis method 155a-156b provides for converting the MPEG video image and the file image to one or more queried RGB digital image representation subframes and file RGB digital image representation subframes, respectively, one or more grey scale digital image representation subframes and file grey scale digital image representation subframes, respectively, and one or more RGB digital image representation difference subframes. The analysis method 155a-156b provides for converting directly from the queried and file RGB digital image representations to the associated subframes.

The analysis method 55a-156b provides for the one or more queried and file grey scale digital image representation subframes 155a, including: defining one or more portions of the queried and file RGB digital image representations as one or more queried and file RGB digital image representation subframes, converting the one or more queried and file RGB digital image representation subframes to one or more queried and file grey scale digital image representation subframes, and normalizing the one or more queried and file grey scale digital image representation subframes.

The method for defining includes initially defining identical pixels for each pair of the one or more queried and file RGB digital image representations. The method for converting includes extracting a luminance measure from each pair of the queried and file RGB digital image representation subframes to facilitate the converting. The method of normalizing includes subtracting a mean from each pair of the one or more queried and file grey scale digital image representation subframes.

The analysis method 155a-156b further provides for a comparing method 155b-156b. The comparing method 155b-156b includes a branching element ending the method flow chart 300 if the second comparing results in no match. The comparing method 155b-156b includes a branching element directing the method flow chart 300 to a detection analysis method 320 if the second comparing method 155b-156b results in a match.

The comparing method 155b-156b includes: providing a registration between each pair of the one or more queried and file grey scale digital image representation subframes 155b and rendering one or more RGB digital image representation difference subframes and a connected queried RGB digital image representation dilated change subframe 156a-b.

The method for providing a registration between each pair of the one or more queried and file grey scale digital image representation subframes 155b includes: providing a sum of absolute differences (SAD) metric by summing the absolute value of a grey scale pixel difference between each pair of the one or more queried and file grey scale digital image representation subframes, translating and scaling the one or more queried grey scale digital image representation subframes, and repeating to find a minimum SAD for each pair of the one or more queried and file grey scale digital image representation subframes. The scaling for method 155b includes independently scaling the one or more queried grey scale digital image representation subframes to one of: a 128×128 pixel subframe, a 64×64 pixel subframe, and a 32×32 pixel subframe.

The scaling for method 155b includes independently scaling the one or more queried grey scale digital image representation subframes to one of: a 720×480 pixel (480i/p) subframe, a 720×576 pixel (576 i/p) subframe, a 1280×720 pixel (720p) subframe, a 1280×1080 pixel (1080i) subframe, and a 1920×1080 pixel (1080p) subframe, wherein scaling can be made from the RGB representation image or directly from the MPEG image.

The method for rendering one or more RGB digital image representation difference subframes and a connected queried RGB digital image representation dilated change subframe 156a-b includes: aligning the one or more queried and file grey scale digital image representation subframes in accordance with the method for providing a registration 155b, providing one or more RGB digital image representation difference subframes, and providing a connected queried RGB digital image representation dilated change subframe.

The providing the one or more RGB digital image representation difference subframes in method 56a includes: suppressing the edges in the one or more queried and file RGB digital image representation subframes, providing a SAD metric by summing the absolute value of the RGB pixel difference between each pair of the one or more queried and file RGB digital image representation subframes, and defining the one or more RGB digital image representation difference subframes as a set wherein the corresponding SAD is below a threshold.

The suppressing includes: providing an edge map for the one or more queried and file RGB digital image representation subframes and subtracting the edge map for the one or more queried and file RGB digital image representation subframes from the one or more queried and file RGB digital image representation subframes, wherein providing an edge map includes providing a Sobol filter.

The providing the connected queried RGB digital image representation dilated change subframe in method 56a includes: connecting and dilating a set of one or more queried RGB digital image representation subframes that correspond to the set of one or more RGB digital image representation difference subframes.

The method for rendering one or more RGB digital image representation difference subframes and a connected queried RGB digital image representation dilated change subframe 156a-b includes a scaling for method 156a-b independently scaling the one or more queried RGB digital image representation subframes to one of: a 128×128 pixel subframe, a 64×64 pixel subframe, and a 32×32 pixel subframe.

The scaling for method 156a-b includes independently scaling the one or more queried RGB digital image representation subframes to one of: a 720×480 pixel (480i/p) subframe, a 720×576 pixel (576 i/p) subframe, a 1280×720 pixel (720p) subframe, a 1280×1080 pixel (1080i) subframe, and a 1920×1080 pixel (1080p) subframe, wherein scaling can be made from the RGB representation image or directly from the MPEG image.

The method flow chart 300 further provides for a detection analysis method 320. The detection analysis method 320 and the associated classify detection method 124 provide video detection match and classification data and images for the display match and video driver 125, as controlled by the user interface 110. The detection analysis method 320 and the classify detection method 124 further provide detection data to a dynamic thresholds method 330, wherein the dynamic thresholds method 330 provides for one of: automatic reset of dynamic thresholds, manual reset of dynamic thresholds, and combinations thereof.

The method flow chart 300 further provides a third comparing method 340, providing a branching element ending the method flow chart 300 if the file database queue is not empty.

Figure 9A:
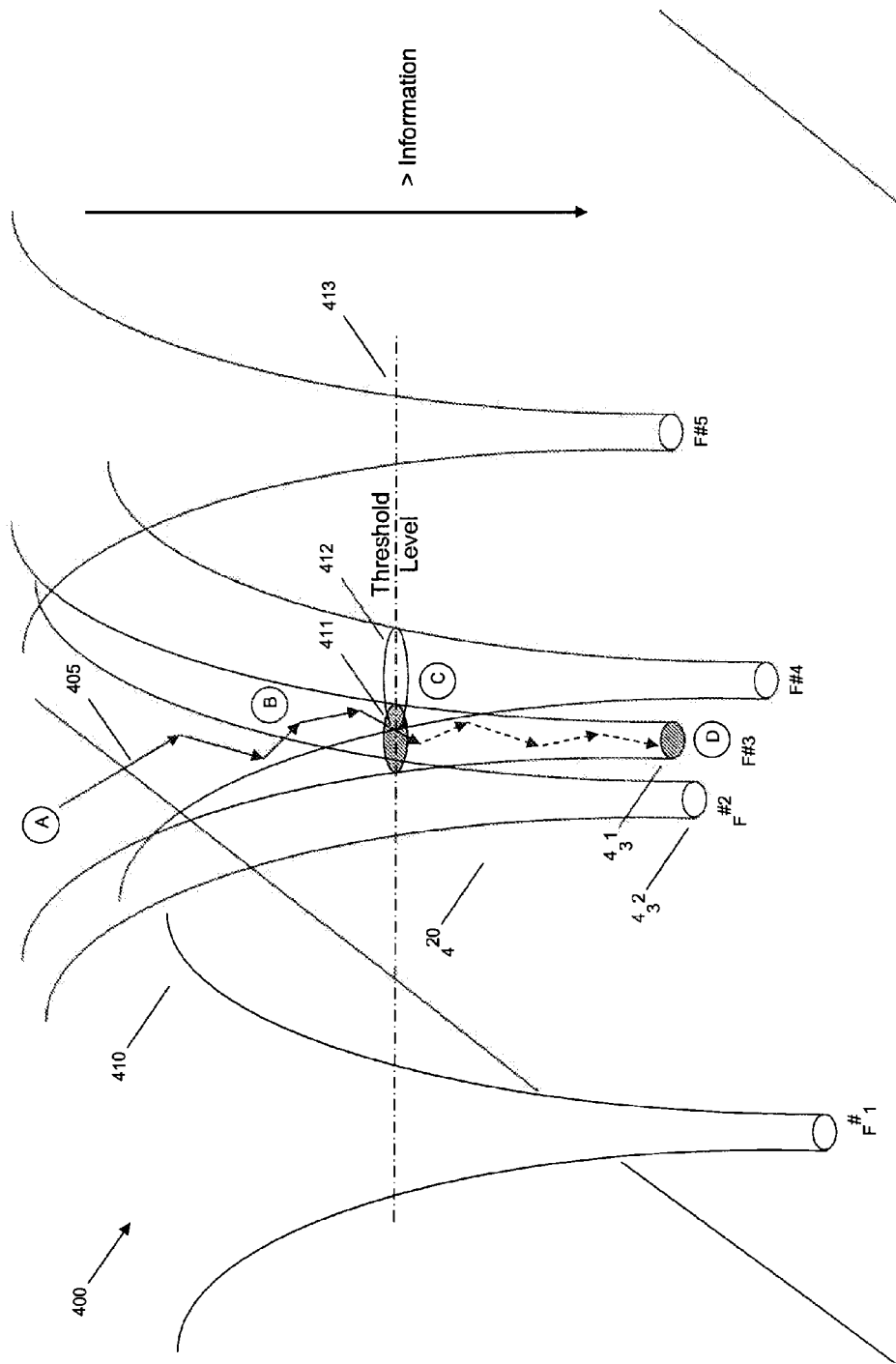
FIG. 9A shows an exemplary traversed set of K-NN nested, disjoint feature subspaces in accordance with an embodiment of the present invention.

FIG. 9A shows a traversed set of K-NN nested, disjoint feature subspaces in feature space 400 in accordance with a first embodiment of the present invention. A queried image 405 starts at A and is funneled to a target file image 431 at D, winnowing file images that fail matching criteria 411 and 412, such as file image 432 at threshold level 413, at a boundary between feature spaces 410 and 420.

Figure 9B:
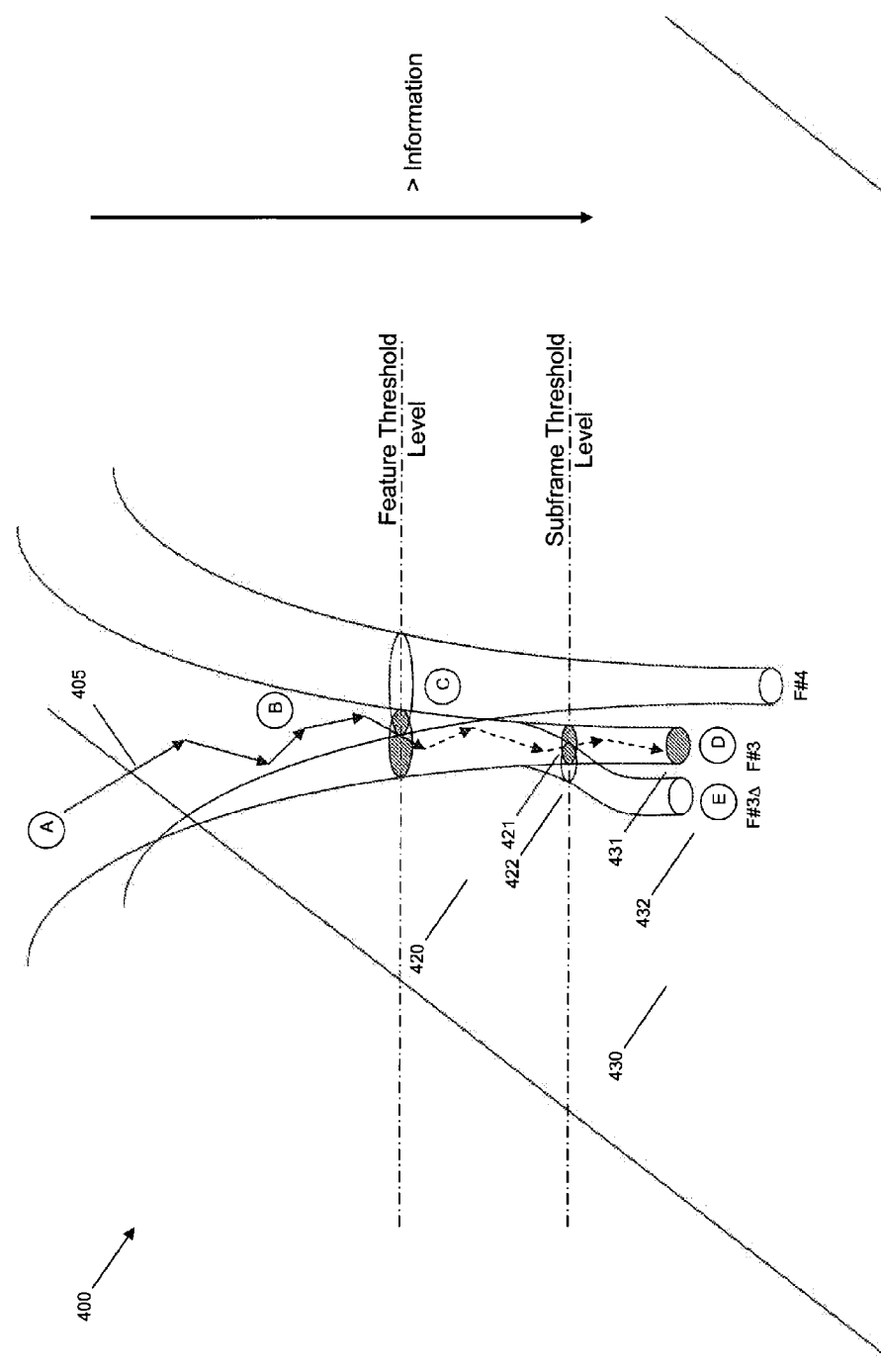
FIG. 9B shows an exemplary traversed set of K-NN nested, disjoint feature subspaces with a change in a digital image representation subframe in accordance with an embodiment of the present invention.

FIG. 9B shows the traversed set of K-NN nested, disjoint feature subspaces with a change in a queried image subframe in accordance with a first embodiment of the present invention. The a queried image 405 subframe 421 and a target file image 431 subframe 422 do not match at a subframe threshold image 431 at a boundary between feature spaces 420 and 430. A match is found with file image 432, and a new subframe 432 is generated and associated with both file image 431 and the queried image 405, wherein both target file image 431 subframe 421 and new subframe 432 comprise a new subspace set for file target image 432.

Figure 10:
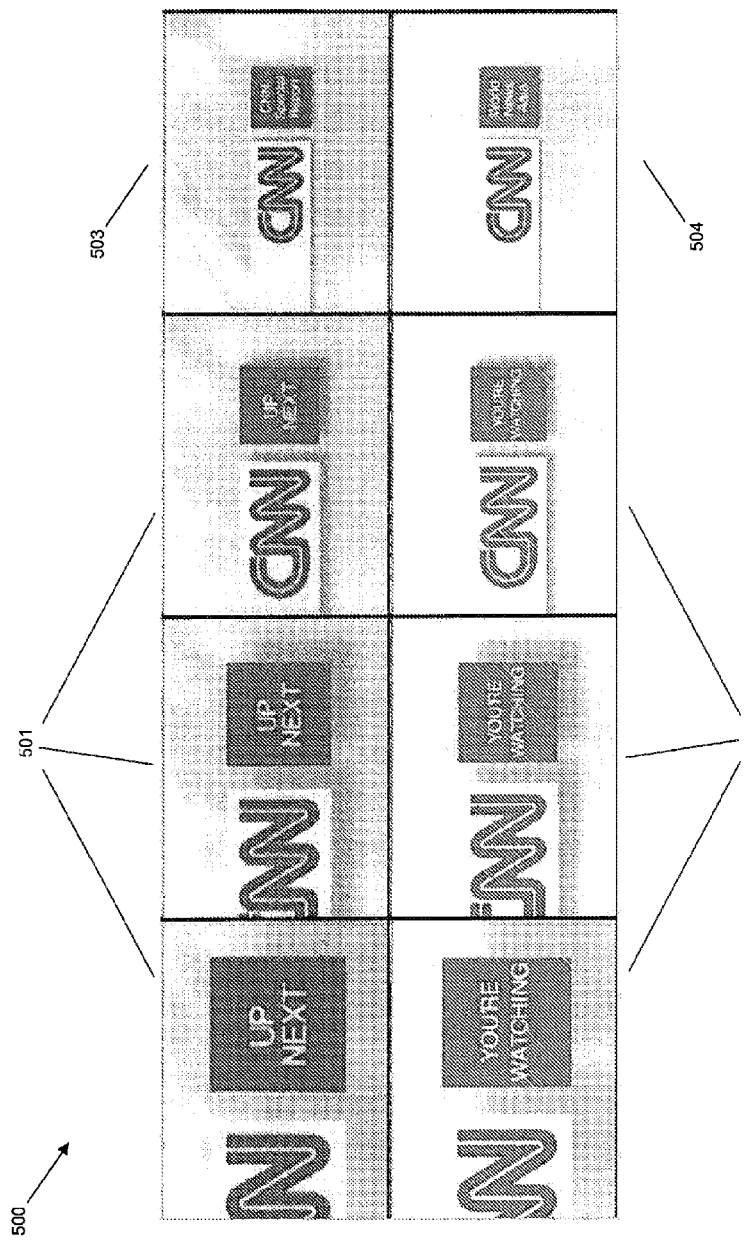
FIG. 10 shows an example of a detectable change in a digital image representation subframe in accordance with an embodiment of the present invention.

FIG. 10 shows an example of a change in a digital image representation subframe in accordance with the first embodiment of the present invention. A set of one of: target file image subframes and queried image subframes 500 are shown, wherein the set 500 includes subframe sets 501, 502, 503, and 504. Subframe sets 501 and 502 differ from other set members in one or more of translation and scale. Subframe sets 502 and 503 differ from each other, and differ from subframe sets 501 and 502, by image content and present an image difference to a subframe matching threshold.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

All publications, patents, and patent applications mentioned in this specification are herein incorporated by reference to the same extent as if each individual publication, patent, or patent application was specifically and individually indicated to be incorporated by reference.

What is claimed is:

1. A video detection method, comprising:
    (a) extracting a feature data set from a queried digital image set and a file digital image set in a first set of file digital image sets;
    (b) measuring one or more errors between the feature data set extracted from the queried digital image set and the file digital image set;
    (c) repeating steps (a)-(b) for one or more file digital image sets in the first set of file digital image sets;
    (d) generating a second set of file digital image sets, wherein the second set consists of each of the file digital image sets in the first set having a corresponding one or more errors less than a corresponding set of thresholds;
    (e) repeating steps (a)-(d) for one or more feature data sets, generating a matching set of file digital image sets;
    (f) measuring one or more bitmap matching errors between one or more subframes of a queried digital image in the queried digital image set and one or more sets of one or more subframes of a file digital image in a file digital image set in the matching set of file digital image sets, wherein the bitmap comprises a set of ordered pixels in an RGB color space;
    (g) translating, resizing, and requantizing the one or more subframes of the queried digital image and repeating (f) to reduce the one or more bitmap matching errors;
    (h) adding, to the one or more sets of one or more subframes of the file digital image, one of: (1) one or more new subframes, and (2) a new set of one or more subframes; and (i) repeating (f)-(h) for one or more file digital images in one or more file digital image sets in the matching set of file digital image sets.

2. The method of claim 1, wherein the extracting in (a) comprises extracting the feature data set by a first function of one or more two-dimensional statistical moments in a COLOR9 space.

3. The method of claim 2, wherein the first function comprises:
(i) temporally segmenting the queried digital image set and the file digital image set into a set of segmented queried digital image subsets and a set of segmented file digital image subsets according to a distance measure of the one or more two-dimensional statistical moments between consecutive queried digital images in the queried digital image set and between consecutive file digital images in the file digital image set; and
(ii) finding one or more queried medians and a corresponding queried image median frame for one or more segmented queried digital image subsets from the one or more two-dimensional statistical moments, and finding one or more file medians and a corresponding file image median frame for one or more segmented file digital image subsets from the one or more two-dimensional statistical moments.

4. The method of claim 3, wherein the measuring in (b) comprises measuring one or more errors between the one or more queried medians and the one or more file medians.

5. The method of claim 3, wherein the extracting in (a) comprises:
extracting a set of two-dimensional wavelet transform coefficients in a COLOR9 space from the queried image median frame for one or more segmented queried digital image subsets; and
extracting a set of two-dimensional wavelet transform coefficients in a COLOR9 space from the file image median frame for one or more segmented file digital image subsets.

6. The method of claim 5, wherein the set of two-dimensional wavelet transform coefficients are Haar wavelet transform coefficients.

7. The method of claim 5, wherein the COLOR9 space is transformed to a grey scale.

8. The method of claim 3, wherein the queried digital image and the file digital image in (f) comprise the queried median image frame and the file median image frame, respectively.

9. The method of claim 2, wherein the set of two-dimensional statistical moments comprises at least one of: a mean, a variance, and a skew.

10. The method of claim 1, wherein the extracting in (a) comprises extracting the feature data set by a second function of two-dimensional statistical moments in a COLOR9 space.

11. The method of claim 10, wherein the second function comprises:
(i) temporally indexing a set of queried digital images in the queried digital image set and a set of file digital images in the file digital image set; and
(ii) assigning a corresponding set of one or more two-dimensional statistical moments to the temporally indexed set of queried digital images and the temporally indexed set of file digital images.

12. The method of claim 11, wherein the measuring in (b) comprises convolving the temporally indexed set of one or more two-dimensional statistical moments for the set of queried digital images and the temporally indexed set of one or more two-dimensional statistical moments for the set of file digital images.

13. The method of claim 10, wherein the set of two-dimensional statistical moments comprises at least one of: a mean, a variance, and a skew.

14. The method of claim 1, wherein the set of ordered pixels comprises one or more sets of: a horizontal offset, a vertical offset, a horizontal segment length, and a vertical segment length.

15. The method of claim 14, wherein the set of ordered pixels is contiguous.

16. The method of claim 1, wherein the translating, resizing, requantizing, and repeating (f) to reduce the one or more bitmap matching errors in (g) comprises one or more feedback loops.

17. The method of claim 1, wherein the translating, resizing, requantizing, and repeating (f) to reduce the one or more bitmap matching errors in (g) comprises an edge detection and suppression function.

18. The method of claim 1, wherein the adding in (h) further comprises adding a subset of the one or more subframes of the queried digital image.

19. An apparatus adapted for producing video detection, comprising:
(a) means for extracting a plurality of feature data sets common to a queried digital image set and for each of a first set of file digital image sets;
(b) means for sequentially searching the plurality of feature data sets for a matching set of file digital image sets, wherein the sequential searching comprises matching the plurality of feature data sets common to the queried digital image set and to a sequentially smaller set of subsets of the first set of file digital image sets;
(c) means for comparing one or more subframes of a queried digital image in the queried digital image set to one or more sets of one or more subframes of a file digital image in a file digital image set in the matching set of file digital image sets, wherein the comparing comprises comparing a set of ordered pixels in an RGB color space, whereby the set of ordered pixels and the RGB color space are common to the queried digital image and to the file digital image;
(d) means for translating, resizing, and requantizing the one or more subframes of the queried digital image and repeating (d) to reduce one or more bitmap matching errors of one or more subsets of the set of ordered pixels, wherein the one or more bitmap matching errors is taken between the queried digital image in a queried digital image set and the file digital image in a file digital image set in the matching set of file digital image sets;
(e) means for detecting a match if the one or more bitmap matching errors is less than a corresponding set of thresholds;
(f) means for adding, if no match is detected, to the one or more sets of one or more subframes of the file digital image, one of: (1) one or more new subframes, and (2) a new set of one or more subframes; and
(g) means for repeating (c)-(f) for one or more file digital images in one or more file digital image sets in the matching set of file digital image sets.

* * * * *